(12) United States Patent
Ghosh et al.

(10) Patent No.: US 11,068,891 B2
(45) Date of Patent: *Jul. 20, 2021

(54) METHODS AND SYSTEMS FOR LEVERAGING TRANSACTIONS TO DYNAMICALLY AUTHENTICATE A USER

(71) Applicant: MASTERCARD INTERNATIONAL INCORPORATED, Purchase, NY (US)

(72) Inventors: Debashis Ghosh, Charlotte, NC (US); Randy Shuken, Westport, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/518,737

(22) Filed: Jul. 22, 2019

(65) Prior Publication Data

US 2019/0340613 A1    Nov. 7, 2019

Related U.S. Application Data

(63) Continuation of application No. 15/676,739, filed on Aug. 14, 2017, now Pat. No. 10,373,164, which is a (Continued)

(51) Int. Cl.
*H04L 29/00* (2006.01)
*G06Q 20/40* (2012.01)
(Continued)

(52) U.S. Cl.
CPC ......... *G06Q 20/4014* (2013.01); *G06F 21/31* (2013.01); *G06F 21/316* (2013.01); (Continued)

(58) Field of Classification Search
CPC ... G06Q 20/4014; G06F 21/316; G06F 21/31; G06F 2221/2149; H04L 9/3271;
(Continued)

(56) References Cited

U.S. PATENT DOCUMENTS 4,528,442 A     7/1985   Endo
5,177,342 A *   1/1993   Adams ................. G06Q 20/403
                                                   235/379

(Continued)

OTHER PUBLICATIONS

Datta et al., Imagination: A Robust Image-based CAPTCHA Generation System, .COPYRGT. 2005, ACM, 4 pages.
(Continued)

*Primary Examiner* — Don G Zhao
(74) *Attorney, Agent, or Firm* — Armstrong Teasdale LLP

(57) ABSTRACT

A system and method for authenticating a candidate user accessing a host computing device as an authentic user is provided. The host computing device is in communication with an authenticating computing device. The method includes receiving, by the authenticating computing device, a request to authenticate the candidate user as an authentic user. The authentication request includes a user identifier. The method also includes retrieving, by the authenticating computing device, transaction data including payment transactions performed by the authentic user based on the user identifier. The method also includes generating, by the authenticating computing device, a challenge question and a correct answer based on the transaction data associated with the authentic user, and transmitting the challenge question for display on a candidate user computing device used by the candidate user.

21 Claims, 8 Drawing Sheets

Related U.S. Application Data continuation of application No. 15/243,349, filed on Aug. 22, 2016, now Pat. No. 9,734,500, which is a continuation of application No. 14/100,789, filed on Dec. 9, 2013, now Pat. No. 9,424,410.

(51) Int. Cl.
  *G06F 21/31* (2013.01)
  *H04L 9/32* (2006.01)
  *H04L 29/06* (2006.01)

(52) U.S. Cl.
  CPC ........ *H04L 9/3271* (2013.01); *H04L 63/0876* (2013.01); *G06F 2221/2149* (2013.01); *H04L 9/3213* (2013.01); *H04L 9/3226* (2013.01); *H04L 9/3273* (2013.01)

(58) Field of Classification Search
  CPC . H04L 63/0876; H04L 9/3273; H04L 9/3213; H04L 9/3226
  See application file for complete search history.

(56) References Cited

U.S. PATENT DOCUMENTS

| | | | |
|---|---|---|---|
| 5,708,422 A * | 1/1998 | Blonder | G06Q 20/40 340/5.41 |
| 5,774,525 A * | 6/1998 | Kanevsky | G06F 21/31 379/188 |
| 5,946,646 A | 8/1999 | Schena et al. | |
| 6,219,793 B1 * | 4/2001 | Li | G07C 9/37 726/19 |
| 6,263,447 B1 * | 7/2001 | French | G06F 21/31 380/30 |
| 6,957,900 B2 | 10/2005 | Hirano et al. | |
| 7,051,002 B2 * | 5/2006 | Keresman, III | G06Q 20/02 705/44 |
| 7,343,351 B1 * | 3/2008 | Bishop | G06Q 20/341 705/67 |
| 7,620,600 B2 | 11/2009 | Pati et al. | |
| 7,707,120 B2 | 4/2010 | Dominguez et al. | |
| 7,739,162 B1 | 6/2010 | Pettay et al. | |
| 7,979,894 B2 | 7/2011 | Royyuru et al. | |
| 8,016,185 B2 | 9/2011 | Modi | |
| 8,136,148 B1 | 3/2012 | Chayanam et al. | |
| 8,156,246 B2 * | 4/2012 | Short | H04L 29/06047 709/239 |
| 8,156,543 B2 * | 4/2012 | Wentker | H04L 63/0884 726/3 |
| 8,239,677 B2 | 8/2012 | Colson | |
| 8,424,061 B2 * | 4/2013 | Rosenoer | G06F 16/258 726/4 |
| 8,509,431 B2 * | 8/2013 | Schmidt | H04L 63/08 380/44 |
| 8,510,795 B1 * | 8/2013 | Gargi | G06F 21/31 726/2 |
| 8,533,118 B2 | 9/2013 | Weller et al. | |
| 8,572,391 B2 * | 10/2013 | Golan | G06F 21/40 713/183 |
| 8,732,089 B1 | 5/2014 | Fang et al. | |
| 8,793,760 B2 * | 7/2014 | Raper | H04L 63/083 726/3 |
| 8,806,600 B2 * | 8/2014 | Taratine | G06F 21/725 726/7 |
| 8,881,227 B2 * | 11/2014 | Rajagopal | G06F 21/62 726/1 |
| 8,898,762 B2 * | 11/2014 | Kang | G06Q 20/12 726/7 |
| 8,904,506 B1 * | 12/2014 | Canavor | G06F 16/00 726/7 |
| 8,957,900 B2 | 2/2015 | Lau et al. | |
| 9,323,915 B2 | 4/2016 | Perez | |
| 2002/0128977 A1 | 9/2002 | Nambiar et al. | |
| 2003/0061566 A1 | 3/2003 | Rubstein et al. | |
| 2003/0154406 A1 * | 8/2003 | Honarvar | G06Q 20/4014 726/10 |
| 2005/0097320 A1 * | 5/2005 | Golan | G06F 21/40 713/166 |
| 2006/0156385 A1 * | 7/2006 | Chiviendacz | H04L 9/3271 726/2 |
| 2006/0272007 A1 | 11/2006 | Sweeley et al. | |
| 2007/0094717 A1 | 4/2007 | Srinivasan et al. | |
| 2007/0192164 A1 | 8/2007 | Nong et al. | |
| 2007/0250920 A1 * | 10/2007 | Lindsay | G07F 7/1025 726/7 |
| 2008/0040276 A1 | 2/2008 | Hammad et al. | |
| 2008/0066165 A1 * | 3/2008 | Rosenoer | H04L 9/3271 726/5 |
| 2008/0098464 A1 | 4/2008 | Mizrah | |
| 2008/0103972 A1 * | 5/2008 | Lane | G06Q 20/4012 705/44 |
| 2008/0120507 A1 * | 5/2008 | Shakkarwar | H04L 63/083 713/182 |
| 2008/0134317 A1 | 6/2008 | Boss et al. | |
| 2008/0275819 A1 * | 11/2008 | Rifai | G06Q 20/32 705/44 |
| 2008/0319896 A1 * | 12/2008 | Carlson | G06Q 20/02 705/38 |
| 2009/0276263 A1 * | 11/2009 | Deb | G06Q 10/06 717/101 |
| 2010/0030839 A1 * | 2/2010 | Ceragioli | H04L 67/1036 709/201 |
| 2010/0063895 A1 | 3/2010 | Dominguez et al. | |
| 2010/0070759 A1 | 3/2010 | Leon Cobos et al. | |
| 2010/0114776 A1 * | 5/2010 | Weller | H04L 9/3213 705/44 |
| 2010/0161470 A1 | 6/2010 | Wiesman et al. | |
| 2011/0026716 A1 | 2/2011 | Tang et al. | |
| 2011/0029902 A1 * | 2/2011 | Bailey | G06T 13/80 715/764 |
| 2011/0078778 A1 * | 3/2011 | Gabriel | H04L 63/083 726/7 |
| 2011/0088087 A1 * | 4/2011 | Kalbratt | G06Q 20/02 726/7 |
| 2011/0113237 A1 | 5/2011 | Hird et al. | |
| 2011/0153461 A1 | 6/2011 | Royyuru | |
| 2011/0197070 A1 | 8/2011 | Mizrah | |
| 2011/0207434 A1 * | 8/2011 | Rozhkov | G06F 21/32 455/411 |
| 2011/0231225 A1 * | 9/2011 | Winters | G06Q 30/0201 705/7.29 |
| 2011/0239281 A1 * | 9/2011 | Sovio | H04L 63/0815 726/5 |
| 2011/0247045 A1 * | 10/2011 | Rajagopal | G06F 21/35 726/1 |
| 2012/0066130 A1 * | 3/2012 | Dominguez | G06Q 20/04 705/44 |
| 2012/0066749 A1 | 3/2012 | Taugbol et al. | |
| 2012/0116976 A1 * | 5/2012 | Hammad | G06Q 20/3821 705/67 |
| 2012/0151567 A1 | 6/2012 | Chayanam et al. | |
| 2012/0210409 A1 * | 8/2012 | Lin | H04L 63/08 726/7 |
| 2012/0214442 A1 * | 8/2012 | Crawford | G06F 21/316 455/411 |
| 2012/0216260 A1 * | 8/2012 | Crawford | G06F 21/31 726/5 |
| 2012/0254940 A1 | 10/2012 | Raper | |
| 2012/0311151 A1 * | 12/2012 | Paulsen | H04L 63/102 709/225 |
| 2013/0036457 A1 | 2/2013 | Vandemar | |
| 2013/0046645 A1 | 2/2013 | Grigg et al. | |
| 2013/0073463 A1 | 3/2013 | Dimmick et al. | |
| 2013/0081119 A1 * | 3/2013 | Sampas | G06Q 20/40145 726/7 |
| 2013/0104197 A1 * | 4/2013 | Nandakumar | G06F 21/40 726/4 |
| 2013/0110658 A1 | 5/2013 | Lyman et al. | |
| 2013/0160098 A1 * | 6/2013 | Carlson | H04L 63/0876 726/6 |
| 2013/0185207 A1 | 7/2013 | Lyons et al. | |

(56) References Cited

U.S. PATENT DOCUMENTS

| | | | |
|---|---|---|---|
| 2013/0218765 A1* | 8/2013 | Hammad | G06Q 20/384 705/41 |
| 2013/0275308 A1 | 10/2013 | Paraskeva et al. | |
| 2013/0318580 A1 | 11/2013 | Gudlavenkatasiva et al. | |
| 2014/0137203 A1 | 5/2014 | Castro et al. | |
| 2014/0171039 A1 | 6/2014 | Bjontegard | |
| 2014/0189808 A1* | 7/2014 | Mahaffey | H04L 63/0853 726/4 |
| 2014/0282974 A1* | 9/2014 | Maher | H04L 9/3271 726/7 |
| 2014/0310183 A1* | 10/2014 | Weber | G06Q 20/20 705/71 |
| 2014/0316989 A1* | 10/2014 | Raper | H04L 63/083 705/44 |
| 2014/0358778 A1* | 12/2014 | Banerjee | G06Q 20/02 705/44 |
| 2014/0372252 A1* | 12/2014 | Raney | G06Q 30/0609 705/26.35 |
| 2015/0106216 A1 | 4/2015 | Kenderov | |
| 2015/0120549 A1 | 4/2015 | Khalid et al. | |
| 2015/0161366 A1* | 6/2015 | Ghosh | H04L 63/0876 726/7 |
| 2015/0161375 A1* | 6/2015 | Ghosh | G06F 21/36 726/7 |
| 2015/0220713 A1* | 8/2015 | Beenau | G06F 21/316 726/19 |
| 2015/0262208 A1 | 9/2015 | Bjontegard | |
| 2016/0262017 A1* | 9/2016 | Lavee | G06F 21/316 |
| 2017/0126690 A1* | 5/2017 | Ogawa | G06F 21/43 |
| 2017/0372316 A1* | 12/2017 | Ghosh | G06F 21/31 |

OTHER PUBLICATIONS

Angeli et al., VIP: a visual approach to user authentication, .COPYRGT. 2002, ACM, 8 pages.

Filyanov et al., Uni-directional Trust Path: Transaction Confirmation on Just One Device, .COPYRGT. 2011, IEEE, 12 pages.

Khusmith et al., Using GSM to Enhance E-Commerce Security, .COPYRGT. 2002, ACM, 7 pages.

Pasupathinathan et al., Formal Analysis of Card-based Payment System in Mobile devices, .COPYRGT. 2006, AISW-NetSec, 8 pages.

Perakslis et al., Social Acceptance of RFID as a Biometric Security Method, .COPYRGT. 2005, IEEE, 10 pages.

Schloglhofer et al., Secure and Usable Authentication on Mobile Devices, .COPYRGT. 2012, ACM, 6 pages.

Verma, icAuth: Image Color Based Authentication System, .COPYRGT. 2012, ACM, 2 pages.

* cited by examiner

METHODS AND SYSTEMS FOR LEVERAGING TRANSACTIONS TO DYNAMICALLY AUTHENTICATE A USER

CROSS REFERENCE TO RELATED APPLICATIONS

This application is a continuation application of U.S. patent application Ser. No. 15/676,739, filed Aug. 14, 2017, entitled "METHODS AND SYSTEMS FOR LEVERAGING TRANSACTIONS TO DYNAMICALLY AUTHENTICATE A USER", which is a continuation application of U.S. patent application Ser. No. 15/243,349, filed Aug. 22, 2016, entitled "METHODS AND SYSTEMS FOR LEVERAGING TRANSACTION DATA TO DYNAMICALLY AUTHENTICATE A USER", which is a continuation application of U.S. patent application Ser. No. 14/100,789, filed Dec. 9, 2013, entitled "METHODS AND SYSTEMS FOR LEVERAGING TRANSACTION DATA TO DYNAMICALLY AUTHENTICATE A USER", the disclosure of each of which are hereby incorporated herein by reference in their entireties.

BACKGROUND OF THE DISCLOSURE

The field of the disclosure relates generally to a payment network for processing payment transactions between an authentic user and a merchant, and more specifically, to a method and system for leveraging transaction data associated with the payment transactions to authenticate a candidate user of a computing device.

Service providers, such as merchants, banks, and/or government agencies, often need to authenticate the identity of a candidate user (i.e. an unauthenticated person claiming to be the authentic user) before allowing the candidate user to access services and systems offered by the service provider. For example, a bank may require authentication, such as identity verification, prior to allowing the candidate user to access bank statements and/or transfer funds. However, authentication of a candidate user that is remotely accessing the service provider through a user computing device can be problematic.

More specifically, previously known computing systems authenticate candidate users based on static security measures provided by, or to, an authentic user for security purposes. Static security measures include, for example, passwords, pin numbers, security questions, and the like. In such known systems, the candidate user is authenticated by providing the static security measure to the service provider along with a username or other identifier. However, static security measures have some inherent drawbacks. Specifically, strong static security measures (e.g., passwords that are difficult to guess by brute force) tend to be complicated and/or difficult for ordinary users to remember. In addition, many users utilize the same security measure for a plurality of service providers. As such, once a security measure is overcome for a single service provider, the user's secure data and services may be compromised for any number of service providers.

More recently, known authentication systems have authenticated candidate users based on other information, such as a current address of the user. However, in some instances the other information, such as the current address of the user, is easily accessible over the internet, in a telephone book, or through other publicly available resources. Further, such known authentication systems generally use information that is changed very infrequently, providing limited protection. Accordingly, there is a need in the art for authentication systems that use dynamic knowledge that is not generally available to, or shared with, the public.

BRIEF DESCRIPTION OF THE DISCLOSURE

In one aspect, a computer-implemented method for authenticating a candidate user accessing a host computing device as an authentic user is provided. The host computing device is in communication with an authenticating computing device. The method includes receiving, by the authenticating computing device, a request to authenticate the candidate user as an authentic user, wherein the authentication request includes a user identifier. The method also includes retrieving, by the authenticating computing device, transaction data including payment transactions performed by the authentic user based on the user identifier. The method also includes generating, by the authenticating computing device, a challenge question and a correct answer based on the transaction data associated with the authentic user, and transmitting the challenge question for display on a candidate user computing device used by the candidate user.

In another aspect, an authenticating computing device for use in authenticating a candidate user accessing a host computing device as an authentic user is provided. The host computing device is in communication with the authenticating computing device, and the authenticating computing device includes a memory and a processor coupled to the memory. The processor is configured to receive, a request to authenticate the candidate user as an authentic user, wherein the authentication request includes a user identifier. The processor is also configured to retrieve transaction data including payment transactions performed by the authentic user based on the user identifier. The processor is also configured to generate a challenge question and a correct answer to the challenge question based on the transaction data associated with the authentic user, and transmit the challenge question for display to the candidate user.

In yet another aspect, a computer readable medium having computer-executable instructions for authenticating a candidate user accessing a host computing device as an authentic user embodied thereon is provided. When executed by at least one processor, the computer-executable instructions cause the at least one processor to receive, a request to authenticate the candidate user as an authentic user, wherein the authentication request includes a user identifier. The computer-executable instructions further cause the at least one processor to retrieve transaction data including payment transactions performed by the authentic user based on the user identifier. The computer-executable instructions further cause the at least one processor to generate a challenge question and a correct answer based on the transaction data associated with the authentic user, and transmit the challenge question for display to the candidate user.

BRIEF DESCRIPTION OF THE DRAWINGS

FIG. 1 shows a system of interrelated steps describing a conventional payment card initiated payment transaction.

FIG. 2 is a simplified block diagram of an example authenticating environment for use in authenticating a candidate user accessing a host computing device.

FIG. 3 is an expanded block diagram of the authenticating environment shown in FIG. 2 and having a server architecture.

FIG. 4 illustrates an example configuration of a computing device as shown in FIGS. 2 and 3.

FIG. 5 illustrates an example configuration of a server system as shown in FIGS. 2 and 3.

FIG. 6 is a simplified flowchart illustrating an example process implemented by the authenticating computing device shown in FIGS. 2 and 3 to leverage transaction data to authenticate the candidate user.

FIG. 7 is an example user interface of the candidate user computing device shown in FIGS. 2 and 3 and illustrating an example challenge question.

FIG. 8 is a diagram of a component layout of the authenticating computing device as shown in FIGS. 2-3.

DETAILED DESCRIPTION OF THE DISCLOSURE

Figure 1:
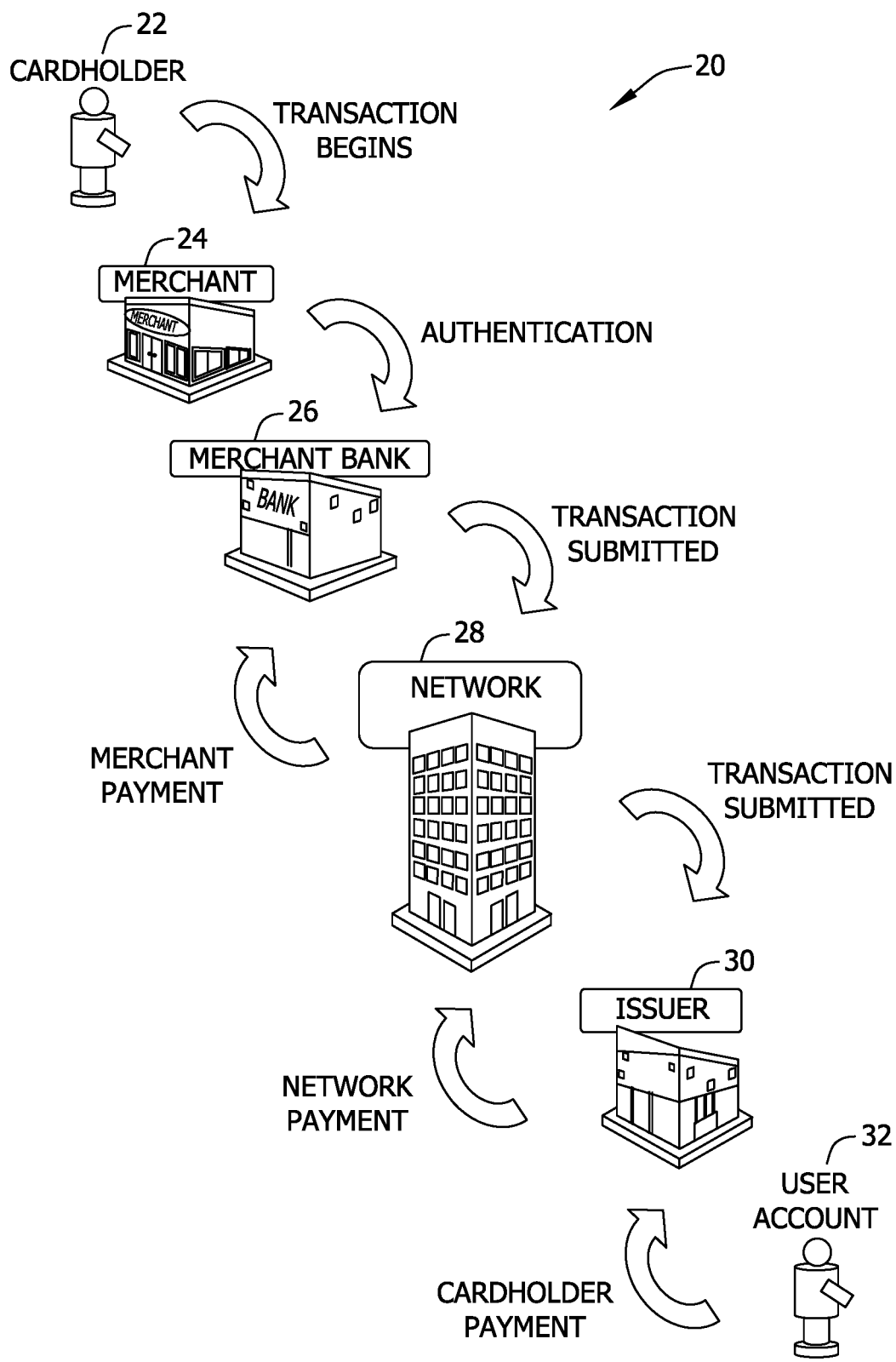
FIGS. 1-8 show example embodiments of the method and system described herein.

Embodiments of the present disclosure describe an authenticating environment including an authenticating computing device in communication with a payment system and a services system. The authenticating computing device leverages transaction data associated with payment transactions performed between an authentic user and a merchant to authenticate a candidate user (i.e., an unauthenticated person claiming to be the authentic user). More specifically, the authenticating payment network determines whether a candidate user is the authentic user based on dynamically testing the candidate user's knowledge of payment transactions performed by the authentic user. For example, the authenticating computing device may test whether the candidate user knows which restaurant the authentic user performed a payment transaction with during the last week based on the transaction data associated with the authentic user.

In the example embodiment, an authentic user initiates a payment transaction with a plurality of merchants, for example to buy a product. The merchants are in communication with a payment network that processes each of the payment transactions, and stores transaction data associated with each of the payment transactions in a memory or database. The transaction data may include, for example, user data that identifies the authentic user associated with the payment transaction, merchant data that identifies the particular merchant associated with the payment transaction, product data that identifies the product purchased by the user, timestamp data that identifies when the payment transaction occurred, purchase amount data that identifies the amount of funds transferred in the payment transaction, and/or any other type of data.

In the example embodiment, the transaction data stored in the memory may be utilized by the authenticating computing device to authenticate the identity of a candidate user. More specifically, a candidate user uses a candidate user computing device to request access to secure data and/or a secure service from a host computing device. The host computing device may be associated with a service provider, for example, a merchant, a bank, a government agency, and/or any other entity that hosts secure data or services that require authentication to be accessed. The host computing device of the service provider receives the request, and communicates with the authenticating computing device to confirm the identity of the candidate user. For example, when the host computing device receives a request from a candidate user to access the authentic user's banking data, the host computing device requests the authenticating computing device confirm that the candidate user is the authentic user.

In the example embodiment, the authenticating computing device receives the request to authenticate the candidate user from the host computing device, and accesses transaction data associated with the authentic user from the memory. In one implementation, the authenticating computing device determines the authentic user associated with the request by comparing the media access control (MAC) address and/or internet protocol (IP) address of the user computing device with respective MAC and IP addresses associated with authentic users. In another implementation, the authenticating payment network determines the authentic user associated with the request based on an identifier received with the authentication request, for example, a username entered by the candidate user. Alternatively, the authenticating payment network may use any method to determine the authentic user that is associated with the request.

The authenticating computing device accesses the transaction data associated with the authentic user, and generates a challenge question based on the stored transaction data. For example, the authenticating computing device may generate a challenge question that asks "Which restaurant did you frequent and perform a payment transaction with last night?" based on transaction data that indicates a payment transaction between the authentic user and a particular restaurant the previous evening. The authenticating computing device may also generate a correct answer to the challenge question. Given the example challenge question above, the correct answer would be the name of the particular restaurant at which the payment transaction occurred. The challenge question is transmitted to the candidate user for display on the candidate user computing device. The candidate user answers the at least one challenge question, for example by entering an answer to the challenge question into the candidate user computing device, and transmitting the answer to the authenticating computing device. The authenticating computing device authenticates the candidate user when the received answer matches the correct answer.

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an example embodiment, namely, systems and methods of leveraging transaction data to authenticate a user. However, it is contemplated that this disclosure has general application to leveraging transaction data in industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

FIG. 1 is a schematic diagram illustrating an example multi-party transaction payment system 20 for enabling ordinary payment transactions in which merchants 24 and card issuers 30 do not need to have a one-to-one special relationship. Embodiments described herein may relate to a transaction system, such as the payment network operated by MasterCard International Incorporated, the assignee of the present disclosure. Such a network is comprised, in part, of a set of proprietary communications standards and protocols for the exchange of financial transaction data and the settlement of funds between financial institutions that are members of the payment network.

In a typical payment system, a financial institution called the "issuer" 30 issues a payment card, such as a credit card, debit card, electronic check, prepaid card, paper check, mobile phone with access to a payment account, or any other form of payment, to a user 22, who uses the payment card to tender payment for a purchase from a merchant 24. To accept payment with the payment card, merchant 24 must normally establish an account with a financial institution that is part of the financial payment system. This financial institution is usually called the "merchant bank," the "acquiring bank," or the "acquirer." When user 22 tenders payment for a purchase with a payment card, merchant 24 requests authorization from a merchant bank 26 for the amount of the purchase. The request may be performed over the telephone, but is usually performed through the use of a point-of-sale (POS) terminal, which reads user's 22 account information from a magnetic stripe, a chip, embossed characters, or other device on the payment card that may be manually inputted into the POS terminal, and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using a payment network 28, computers of merchant bank 26 or merchant processor will communicate with computers of an issuer bank 30 to determine whether the payment transaction should be authorized. This may include a number of factors such as, whether user's 22 account 32 is in good standing, and whether the purchase is covered by user's 22 available credit line. If the request is accepted, an authorization code is issued to merchant 24.

When a request for authorization is accepted, the available credit line of user's 22 account 32 is decreased. In some cases, a charge for a payment transaction may not be posted, i.e., "captured" immediately to user's 22 account 32, whereas in other cases, especially with respect to at least some debit card transactions, a charge may be posted or captured at the time of the transaction. In some cases, when merchant 24 ships or delivers the goods or services, merchant 24 captures the transaction by, for example, appropriate data entry procedures on the POS terminal. This may include bundling of approved transactions daily for standard retail purchases. If user 22 cancels a transaction before it is captured, a "void" is generated. If user 22 returns goods after the transaction has been captured, a "credit" is generated. Payment network 28 and/or issuer bank 30 stores the payment card information, such as a type of merchant, amount of purchase, date of purchase, in a database 120 (shown in FIG. 2).

For debit card transactions, when a request for a PIN authorization is approved by the issuer, the consumer's account is decreased. Normally, a charge is posted immediately to a consumer's account. The issuer 30 then transmits the approval to the merchant bank 26 via the payment network 28, with ultimately the merchant 24 being notified for distribution of goods/services, or information or cash in the case of an ATM.

After a purchase has been made, a clearing process occurs to transfer additional transaction data related to the purchase among the parties to the transaction, such as merchant bank 26, payment network 28, and issuer bank 30. More specifically, during and/or after the clearing process, additional data, such as a time of purchase, a merchant name, a type of merchant, purchase information, user account information, a type of transaction, itinerary information, information regarding the purchased item and/or service, and/or other suitable information, is associated with a transaction and transmitted between parties to the transaction as transaction data, and may be stored by any of the parties to the transaction. In the example embodiment, when user 22 purchases travel, such as airfare, a hotel stay, and/or a rental car, at least partial itinerary information is transmitted during the clearance process as transaction data. When payment network 28 receives the itinerary information, payment network 28 routes the itinerary information to database 120 (shown in FIG. 2).

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and payment network 28, and then between payment network 28 and merchant bank 26, and then between merchant bank 26 and merchant 24.

Figure 2:
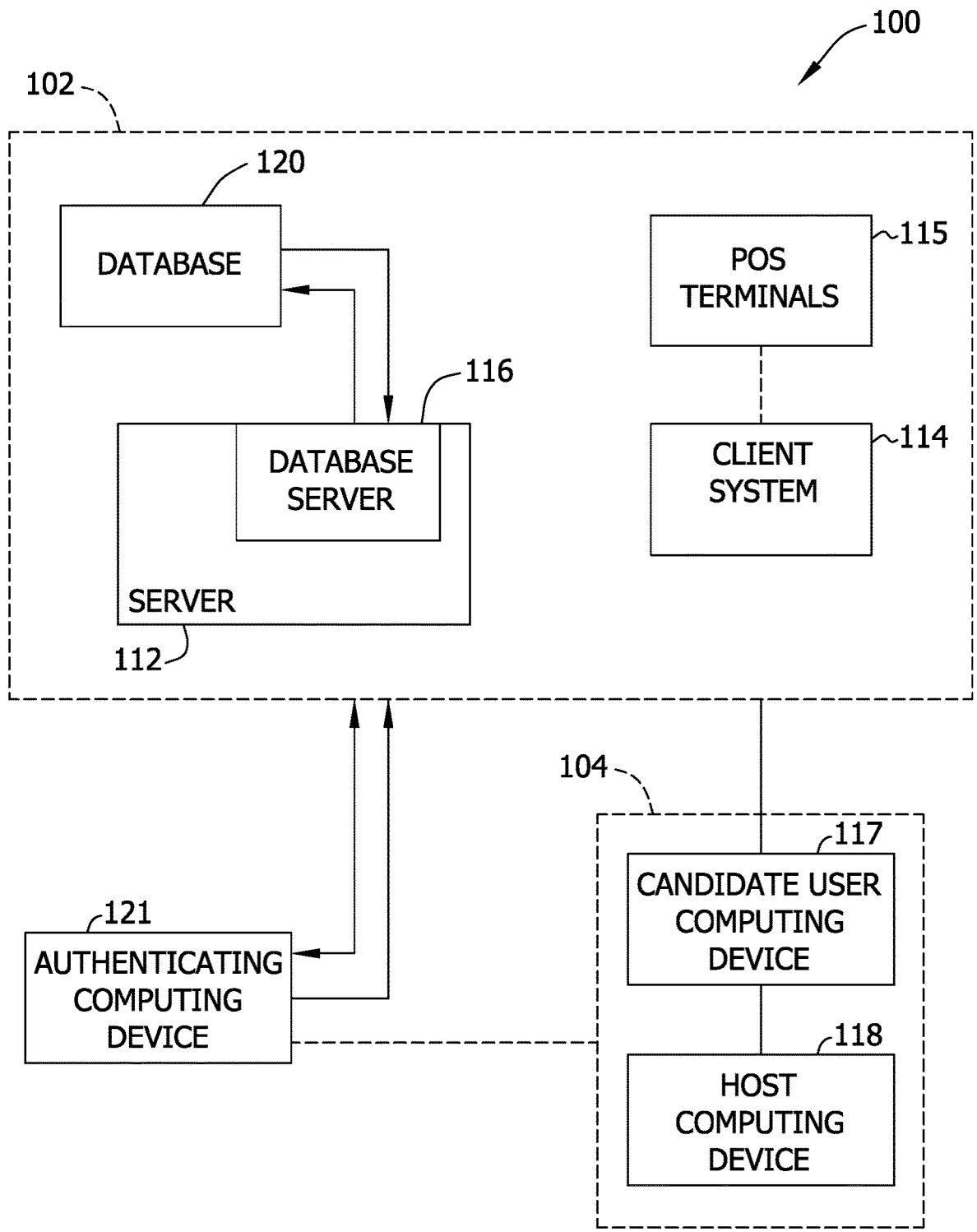

FIG. 2 is a simplified block diagram of an example authenticating environment 100 for use in authenticating a candidate user is an authentic user. Authenticating environment 100 includes a plurality of systems and computing devices, such as a payment sub-system 102, a services sub-system 104, and an authenticating computing device 121. Payment sub-system 102 includes a plurality of computer devices such as server system 112, client systems 114, POS terminals 115, and database 120. Payment sub-system 102 processes payment transactions between an authentic user and a plurality of merchants, and generates transaction data based on those transactions. Services sub-system 104 includes a candidate user computing device 117 and a host computing device 118, the host computing device 118 stores data and/or provides services that are accessed by the candidate user computing device 117. Services sub-system 104 may communicate with authenticating computing device 121 to manage communications between candidate user computing device 117 and host computing device 118. Authenticating computing device 121 offers authentication services to services sub-system 104 in accordance with one embodiment of the present disclosure. Specifically, authenticating computing device 121 implements a process that leverages transaction data stored by payment sub-system 102 to authenticate a candidate user is the authentic user.

In the example embodiment, payment sub-system 102 includes server system 112, and a plurality of client systems 114 connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

Payment sub-system 102 also includes point-of-sale (POS) terminals 115, which may be connected to client systems 114, and may be connected to server system 112. POS terminals 115 are interconnected to the Internet through many interfaces including a network, such as a local area network (LAN) or a wide area network (WAN), dial-in-connections, cable modems, wireless modems, and special high-speed ISDN lines. POS terminals 115 could be any device capable of interconnecting to the Internet and including an input device capable of reading information from a consumer's payment card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network, including data relating to merchants, account holders or customers, issuers, acquirers, and/or purchases made. In one implementation, database 120 stores transaction data including at least one of timestamp data indicative of a time the transaction occurred, purchase data indicative of a product, i.e., a good or service, that has been purchased and/or leased, purchase amount data indicative of an amount of funds associated with the transaction, merchant data including a merchant identifier that identifies the merchant associated with the payment transaction, and/or user data including at least one of a user name, a user address, an account number, and other account identifier. Database 120 may store the merchant identifier in a list that identifies each merchant registered to use the network, and instructions for settling transactions including merchant bank account information.

Services sub-system 104 includes candidate user computing device 117 and host computing device 118. Host computing device 118 is configured to communicate with at least one of server system 112, client systems 114, and candidate user computing device 117. In the exemplary embodiment, host computing device 118 is associated with or controlled by a service provider for securely storing data and providing secure services. Host computing device 118 is interconnected to the Internet through many interfaces including a network, such as a local area network (LAN) or a wide area network (WAN), dial-in-connections, cable modems, wireless modems, and special high-speed ISDN lines. Host computing device 118 could be any device capable of interconnecting to the Internet including a web-based phone, personal digital assistant (PDA), or other web-based connectable equipment. In one embodiment, host computing device 118 is configured to communicate with client system 114 and/or candidate user computing device 117 using various outputs including, for example, Bluetooth communication, radio frequency communication, near field communication, network-based communication, and the like. More specifically, in one embodiment, host computing device 118 communicates with candidate user computing device 117 through a website associated with the service provider.

Authenticating environment 100 also includes an authenticating computing device 121 that is in communication with payment sub-system 102 and/or services sub-system 104. Authenticating computing device 121 may be a stand-alone computing device that includes a processor and a memory and is configured to communicate with server system 112, client system 114, candidate user computing device 117, host computing device 118, and/or database 120. Alternatively, authenticating computing device 121 may be integrated with server system 112. Authenticating computing device 121 provides services that enable host computing device 118 to authenticate the identity of a candidate user. More specifically, authenticating computing device 121 leverages transaction data stored in database 120 to generate a challenge question and at least one correct answer related to a payment transaction initiated by an authentic user. Authenticating computing device 121 provides the challenge question to the candidate user through candidate user computing device 117, and receives an answer from the candidate user. Authenticating computing device 121 authenticates that the candidate user is the authentic user when the received answer is the correct answer.

In the example embodiment, one of client systems 114 may be associated with an acquirer bank, and/or a merchant while another one of client systems 114 may be associated with an issuer, and/or an authentic user. Candidate user computing device 117 is associated with a candidate user; POS terminal 115 may be associated with merchant 24; host computing device 118 may be associated with a service provider, and server system 112 may be associated with payment sub-system 102.

Figure 3:
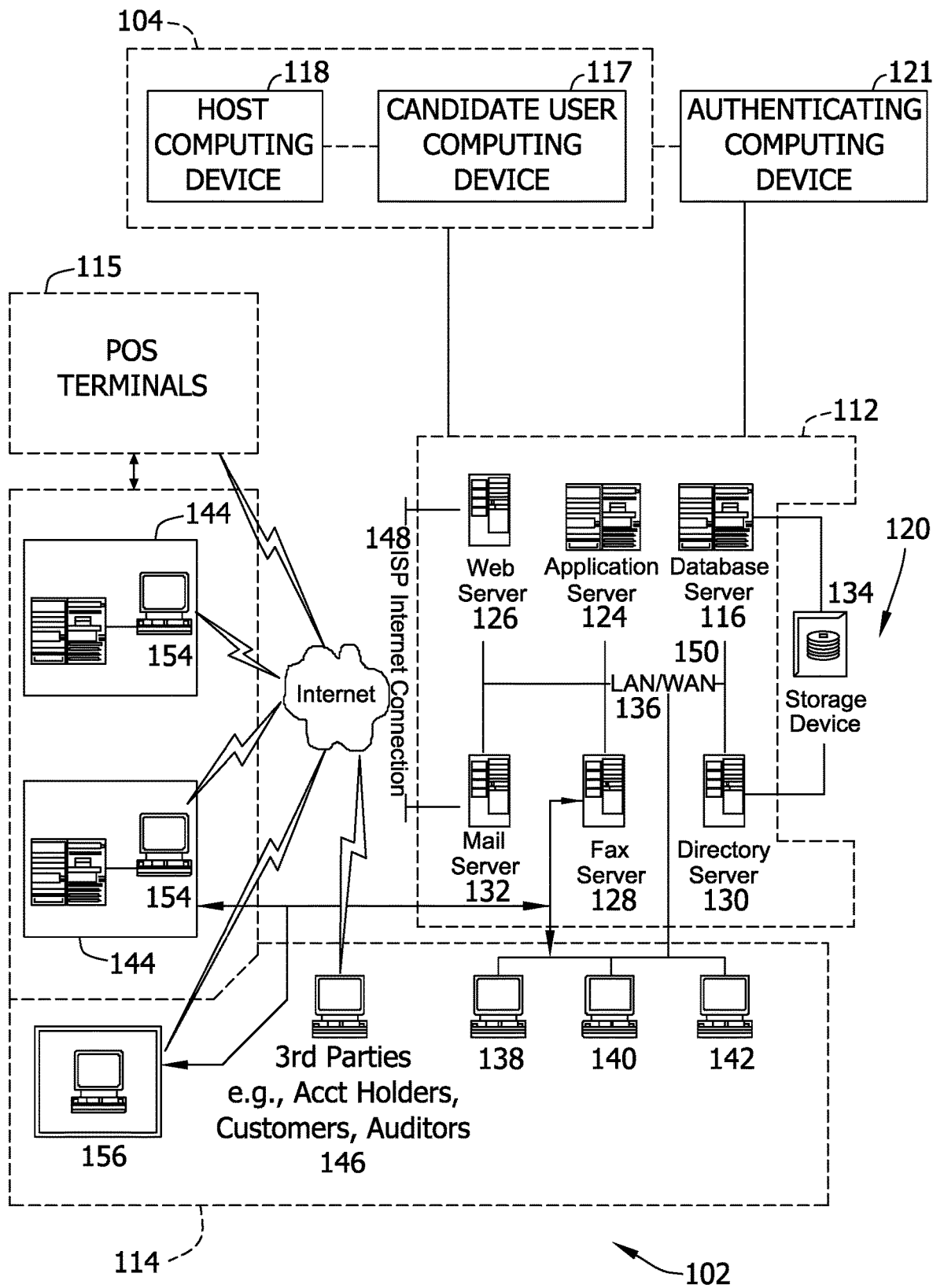

FIG. 3 is an expanded block diagram of an example server architecture of authenticating environment 100 including other computer devices in accordance with one embodiment of the present disclosure. Payment sub-system 102 includes server system 112, client systems 114, and POS terminals 115. Server system 112 further includes database server 116, an application server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet and a WAN type communication, however, any other type communication can be utilized in other embodiments, i.e., the systems and processes are not limited to being practiced using the Internet. In addition, rather than WAN 150, LAN 136 could be used.

In the example embodiment, any authorized individual having a workstation 154 can access processing system 122. At least one of the client systems 114 includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Services sub-system 104, including candidate user computing device 117 and host computing device 118, may communicate internally, and with payment network 102 and authenticating computing device 121, through any suitable network communication method including, but not limited to, WAN 150 type communications, LAN 136 type communications, 3G type communications, or WIMAX type communications.

Authenticating computing device 121 may communicate with payment sub-system 102 and services sub-system 104 through any suitable network communication method including, but not limited to, Wide Area Network (WAN) 150 type communications, LAN 136 type communications, 3G type communications, or Worldwide Interoperability for Microwave Access (WIMAX) type communications.

Figure 4:
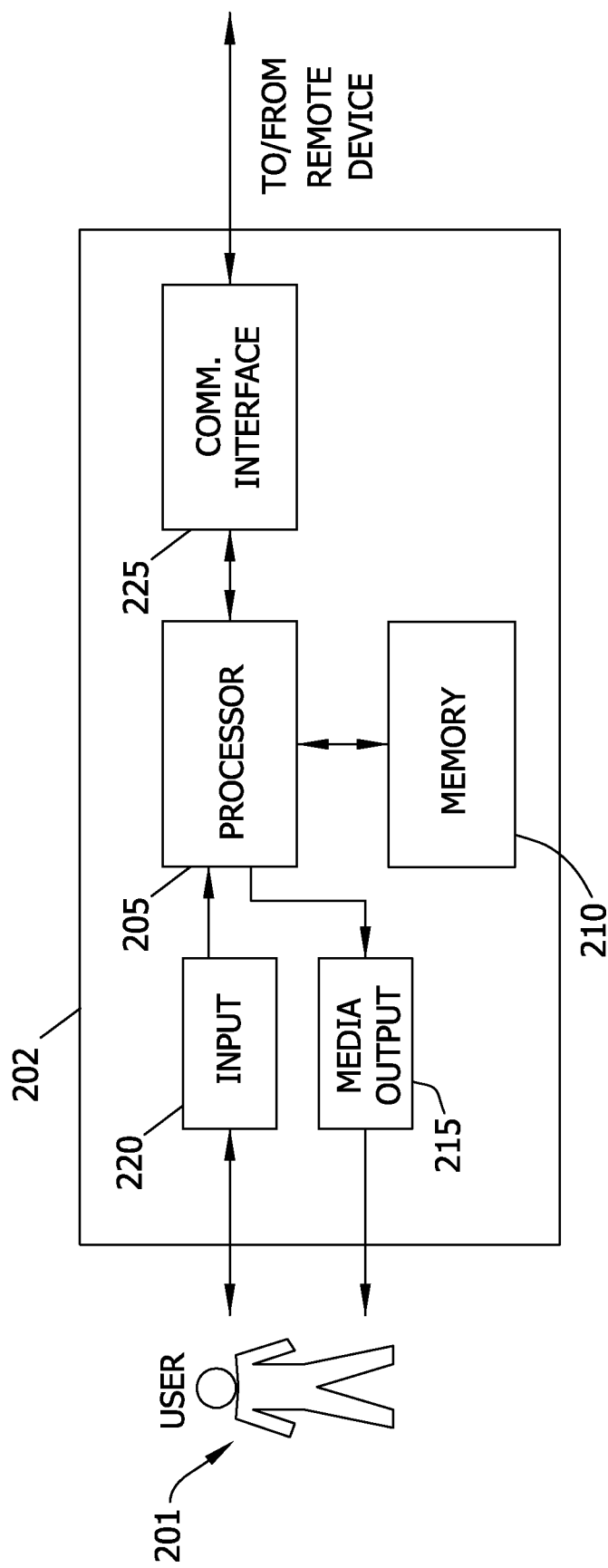

FIG. 4 illustrates an example configuration of a user system 202 operated by a user 201, such as an individual associated with merchant 24 (shown in FIG. 1). User system 202 may include, but is not limited to, client systems 114, 138, 140, and 142, POS terminal 115, host computing device 118, authenticating computing device 121, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information, such as executable instructions and/or written works, to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, such as a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, and/or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network such as WIMAX.

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
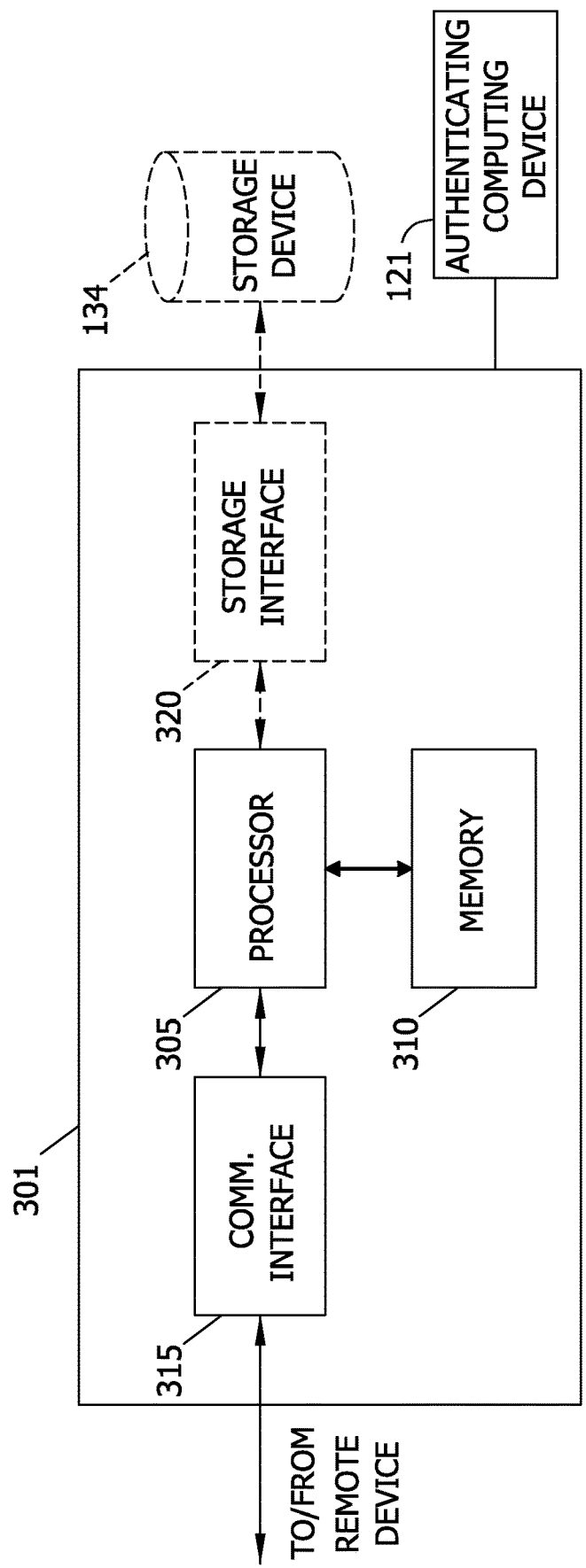

FIG. 5 illustrates an example configuration of a server system 301 such as server system 112 (shown in FIGS. 2 and 3). Server system 301 may include, but is not limited to, database server 116, application server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Server system 301 may be communicatively coupled to authenticating computing device 121. Authenticating computing device 121 enables server system 301 to offer authentication services, including services to confirm the identity of a candidate user accessing information from host computing device 118 (shown in FIG. 2). In the example embodiment, authenticating computing device 121 may be external to server system 301 and may be accessed by multiple server systems 301. For example, authenticating computing device 121 may be a stand-alone computing device coupled to a memory unit. In some embodiments, authenticating computing device 121 may be integrated with server system 301. For example, authenticating computing device 121 may be a specifically programmed section of server system 301 configured to perform the functions described herein when executed by processor 305.

Processor 305 is operatively coupled to a communication interface 315 such that server system 301 is capable of communicating with a remote device such as a user system or another server system 301. For example, communication interface 315 may receive requests from client system 114 and host computing device 118 via the Internet, as illustrated in FIGS. 2 and 3.

Processor 305 may be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320.

Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
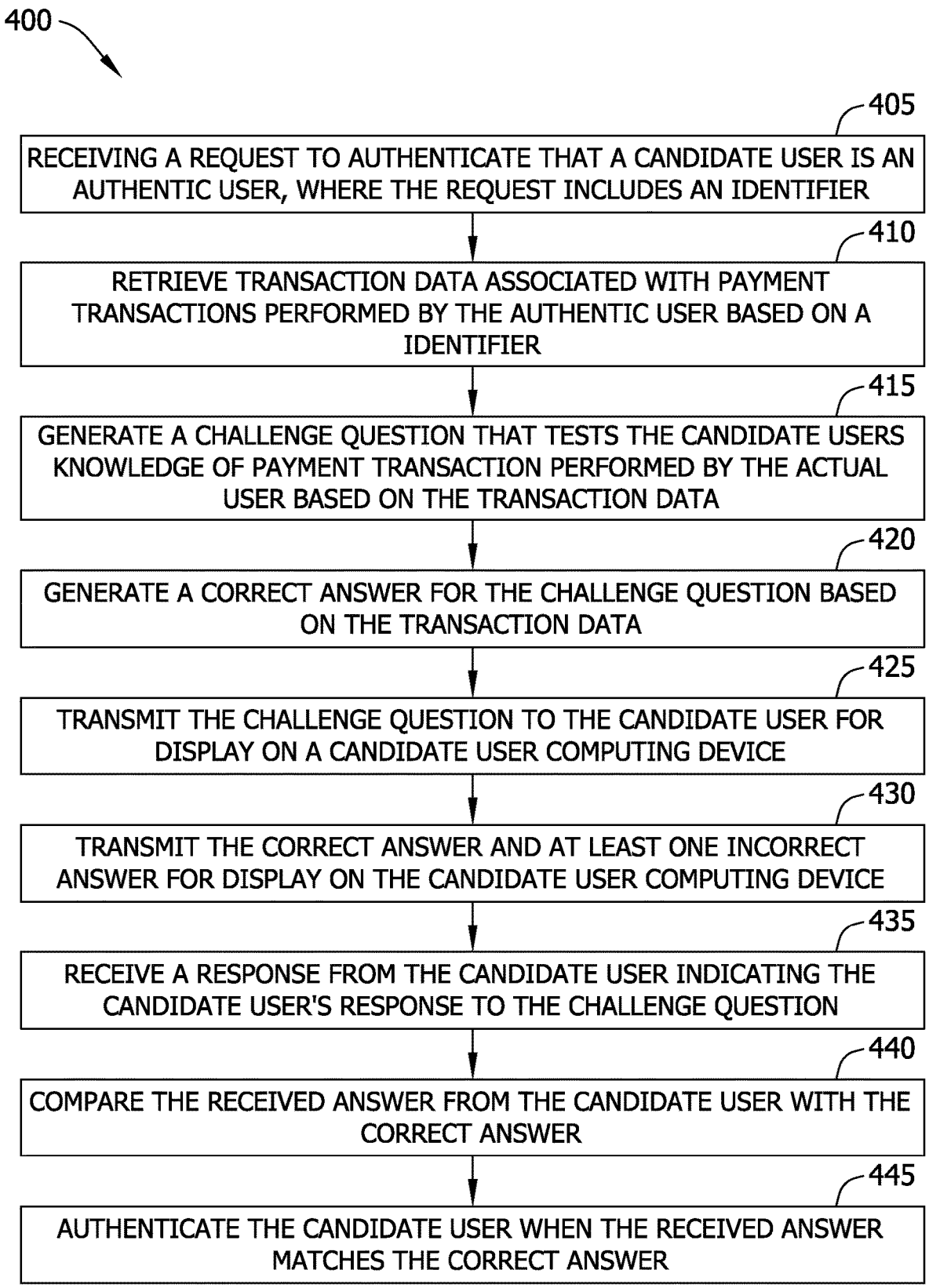

FIG. 6 is a simplified flowchart illustrating an example process 400 implemented by authenticating computing device 121 (shown in FIG. 2) to authenticate a candidate user based on transaction data generated by payment subsystem 102 (shown in FIG. 2). Specifically, authenticating computing device 121 receives 405 a request to authenticate a candidate user as an authentic user when, for example, the candidate user requests access to secure data (e.g., bank statements, e-mail accounts, and/or online profiles) on host computing device 118 (shown in FIG. 2). In some implementations, the authentication request includes a name, or other identifier, associated with a particular authentic user from host computing device 118. For example the identifier may be the name of the authentic user the candidate user is claiming to be. In another implementation, authenticating computing device 121 receives an identifier of candidate user computing device 117, such as the MAC and/or IP address of candidate user computing device 117, and compares the identifier with a predefined list of MAC and/or IP addresses of computing devices associated with the authentic user.

Authenticating computing device 121 retrieves 410 transaction data associated with payment transactions performed by the authentic user based on the identifier. The transaction data includes data indicative of at least one of a merchant with whom the authentic user performed a payment transaction, a time period during which the authentic user performed a particular payment transaction, the amount of a particular payment transaction, and a product associated with a particular payment transaction.

Also, in the example embodiment, authenticating computing device 121 generates 415 a challenge question based on the transaction data associated with the authentic user. The challenge question tests the candidate user's knowledge of previous payment transactions performed by the authentic user. The challenge question may include tests regarding the time a particular payment transaction occurred, the product purchased in a payment transaction, a particular merchant associated with a payment transaction, a payment amount associated with a particular payment transaction, and/or any other question generated based on the transaction data. For example, the challenge question may ask "Which restaurant did you frequent and perform a payment transaction with last night?," What product did you purchase from a particular merchant with your payment card?," "When was the last time you went to a particular merchant and performed a payment transaction?," and/or any other question. In some embodiments, authenticating computing device 121 may generate a plurality of challenge questions based on the transaction data. In some implementations, the challenge question may be a true or false type question.

Authenticating computing device 121 also generates 420 a correct answer for the challenge question based on the transaction data. The correct answer is a statement indicated as being true for the particular authentic user based on the transaction data. For example, if the challenge question is "Which restaurant did you frequent and perform a payment transaction with last night?," the correct answer is the restaurant which the transaction data indicated the authentic user frequented the previous night. In some instances, the correct answer may be a range or generic group, for example, the correct answer may be a time range, e.g., 6:00-7:00, that includes the time indicated by timestamp data, e.g., 6:32. In some implementations, the correct answer is represented by an image, for example, the correct answer may be an image of a merchant or a product associated with the transaction data.

In the example embodiment, authenticating computing device 121 generates 415, 420 the challenge question and the correct answer in response to the authentication request. In other embodiments, authenticating computing device 121 generates 415 the challenge question before receiving the authentication request and generates 420 the correct answer in response to receiving the authentication request. Alternatively, the challenge question and the correct answer are both generated 415, 420 before authenticating computing device 121 receives the authentication request. Authenticating computing device 121 may store the generated challenge questions and correct answers in memory, such as database 120. Alternatively, authenticating computing device 121 may transmit the generated challenge questions and correct answers to host computing device 118 for storage.

Authenticating computing device 121 may also generate 415, 420 the challenge question and/or the correct answer based on transaction data from a predefined period of time, such as the last day, the last week, the last month, or any other preset time period. In some implementations the time period and/or type of challenge question may be selected may be based on a desired level of security and/or ease of use for the candidate user. For example, the challenge question "which grocery store do you purchase groceries at most frequently" may be relatively less secure than "Which grocery store did you purchase groceries at last Friday?"

Authenticating computing device 121 also transmits 425 the challenge question to the candidate user for display on candidate user computing device 117. Authenticating computing device 121 may transmit the challenge question directly to the candidate user. Alternatively, authenticating computing device 121 may also transmit the challenge question to the candidate user through host computing device 118. For example, the challenge question may be displayed on a website or portal associated with host computing device 118. In some implementations, authenticating computing device 121 also transmits 430 the correct answer and at least one incorrect answer to the candidate user along with the challenge question. More specifically, authenticating computing device 121 transmits 430 a multiple choice type challenge question to candidate user computing device 117, and prompts the candidate user to select the correct answer from among the plurality of correct and incorrect answers.

In the example embodiment, authenticating computing device 121 receives 435 the candidate user's answer to the challenge question from candidate user computing device 117, and compares 440 the candidate user's answer with the correct answer. Authenticating computing device 121 authenticates 445 the candidate user when the correct answer and the candidate user's answer match. In other implementations authenticating computing device 121 provides the correct answer to host computing device 118, and host computing device 118 compares the candidate user's answer with the correct answer and authenticates the candidate user as the authentic user.

Figure 7:
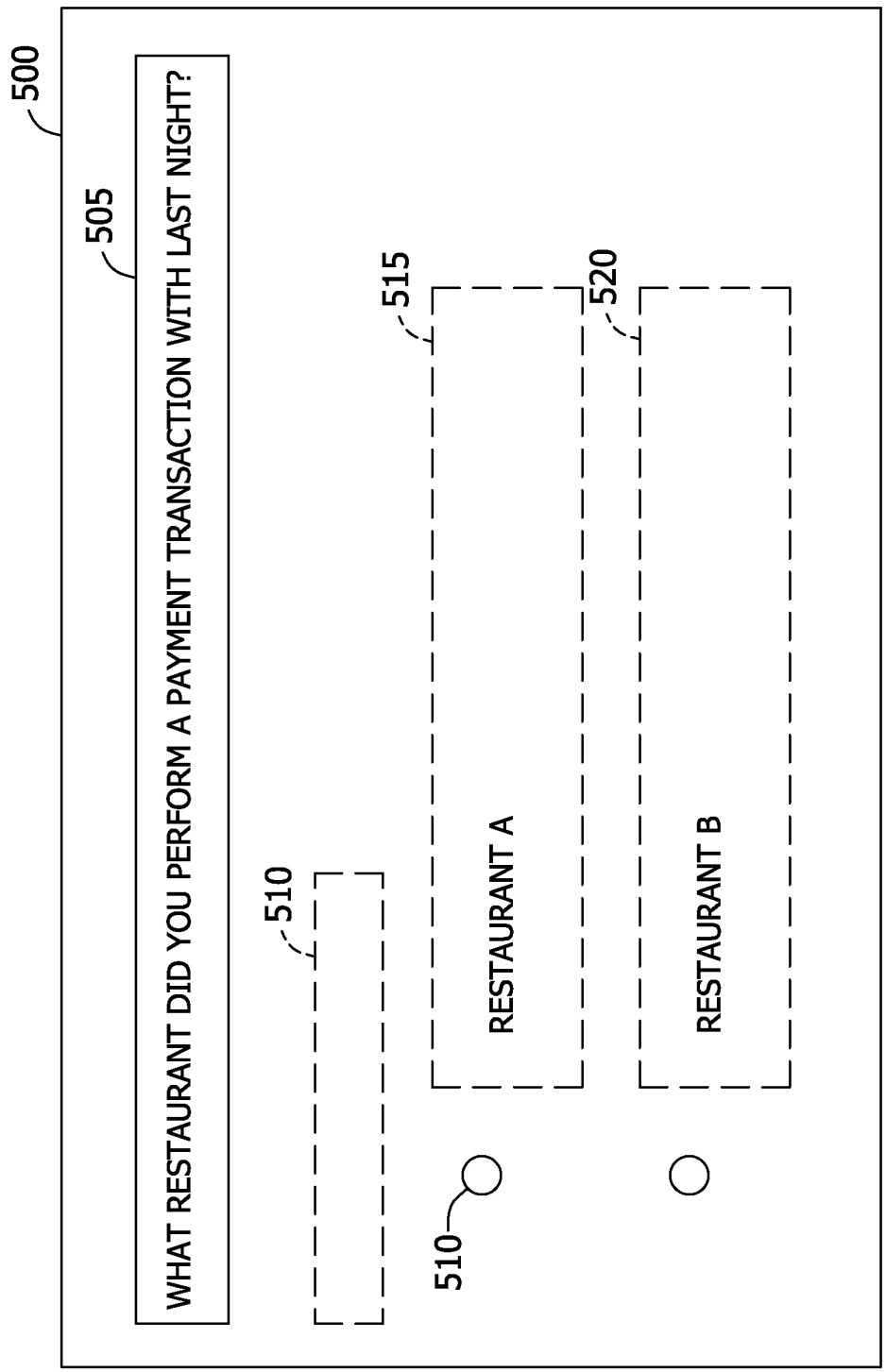

FIG. 7 is an example user interface 500 of candidate user computing device 117 (shown in FIG. 2) during an authentication process implemented by the authenticating computing device 121. User interface 500 may display a website or portal associated with at least one of host computing device 118 and authenticating computing device 121.

In the example embodiment, user interface 500 includes at least one challenge question 505 that tests the candidate user's knowledge of payment transactions performed by the authentic user. User interface 500 also includes at least one data entry device 510 through which candidate user responds to the challenge question.

Data entry device 510 may be, for example, a text box through which the candidate user enters a textual response to challenge question 505, e.g., the name of a particular merchant. Data entry device 510 may also be, for example, an interactive element that may be selected or unselected by the candidate user to indicate an answer. Alternatively, data entry device 510 may be any device that enables the candidate user to respond to challenge question 505.

User interface 500 may also display at least one correct answer 515 and at least one incorrect answer 520 along with challenge question 505. Incorrect answer 520 may be based on correct answer 515 and indicate similar material to correct answer 515, such as similar merchants, similar products, etc. In another implementation, incorrect answer 520 may be determined such that incorrect answer 520 indicates at least one of a time, a merchant, and a product that is not associated with a payment transaction performed by the authentic user. In such an implementation, the candidate user is less likely to be confused by actual payment transactions performed by the authentic user.

A selectable data entry device 510 may be provided in proximity to each of correct answer 515 and incorrect answers 520. Challenge question 505 may prompt the candidate user to select one of the provided plurality of answers as the correct answer, and the candidate user indicates a selection using data entry devices 510.

Figure 8:
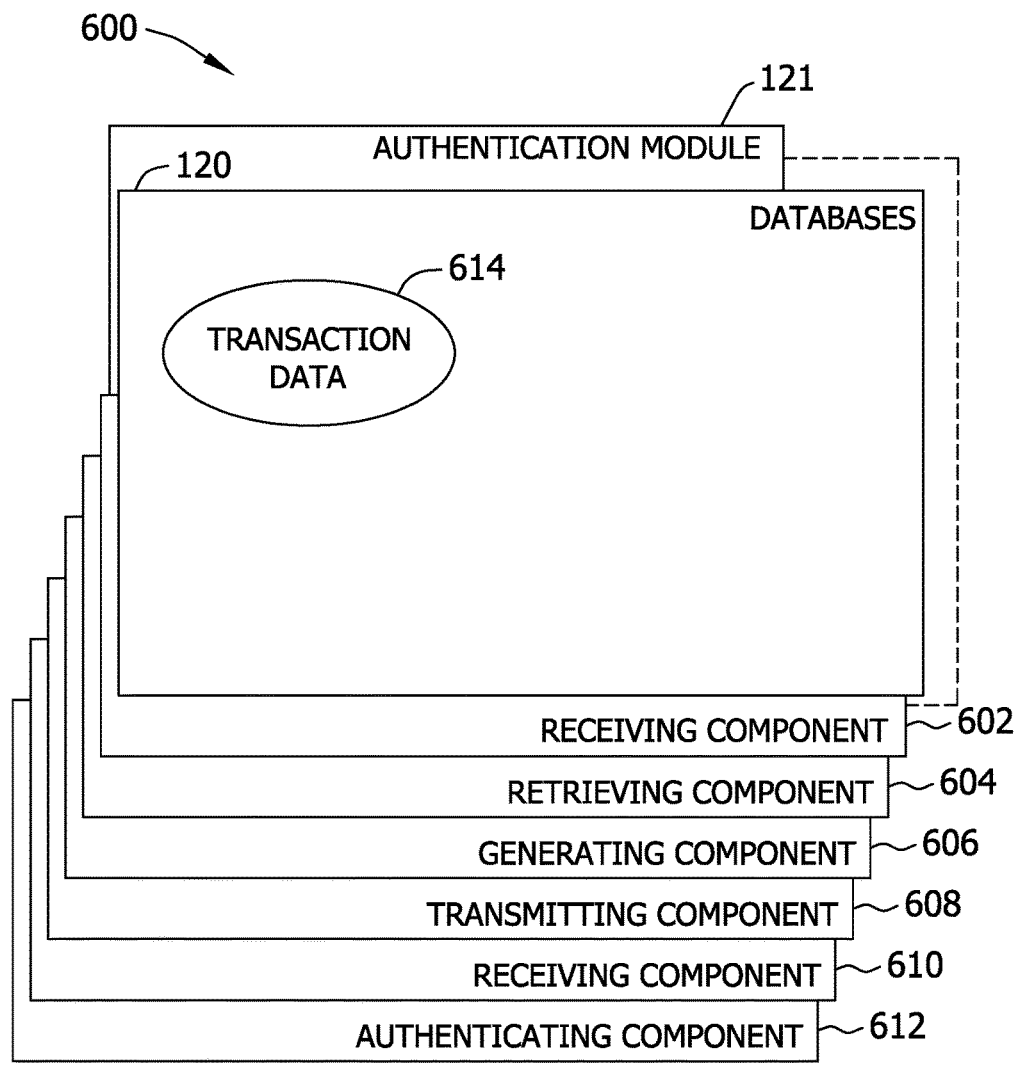

FIG. 8 is a diagram of a component layout of a computing device as shown in FIGS. 2-3. For example, one or more of computing devices may form authenticating computing device 121. FIG. 8 further shows a configuration of database 120. Database 120 is coupled to several separate components within authenticating computing device 121, which perform specific tasks.

Authenticating computing device 121 includes a receiving component 602 for receiving a request to authenticate a candidate user accessing host computing device 118 (shown in FIG. 2). The request may include an identifier that indicates the identity of the authentic user associated with the authentication request. Authenticating computing device 121 also includes a retrieving component 604 that retrieves transaction data associated with the authentic user from memory based on the identifier. Specifically, retrieving component 604 retrieves transaction data for one of a plurality of authentic users from database 120 of payment sub-system 102 (shown in FIG. 2) based on the identifier. Authenticating computing device 121 also includes a generating component 606 that generates at least one of challenge question 505 (shown in FIG. 7), correct answer 515 (shown in FIG. 7), and incorrect answer 520 (shown in FIG. 7) based on the retrieved transaction data. Authenticating computing device 121 also includes a transmitting component 608 for transmitting the challenge question to the candidate user for display on candidate user computing device 117. Authenticating computing device 121 may also include a receiving component 610 for receiving answers to each challenge question from the candidate user. Authenticating computing device 121 may also include an authenticating component 612 that authenticates that the candidate user is the authentic user when the received answers match the respective correct answers.

In an example embodiment, database 120 includes, but is not limited to, a transaction data section 614. Transaction data section 614 includes transaction data associated with a plurality of payment transactions performed by a plurality of authentic users over payment sub-system 102 (shown in FIG. 2)

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 212, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is for (a) receiving, by the authenticating computing device, a request to authenticate the candidate user as an authentic user, wherein the authentication request includes a user identifier; (b) retrieving, by the authenticating computing device, transaction data including payment transactions performed by the authentic user based on the user identifier; (c) generating, by the authenticating computing device, a challenge question and a correct answer based on the transaction data associated with the authentic user; and (d) transmitting the challenge question for display to the candidate user.

Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments provide a method and system of leveraging transaction data to authenticate a candidate user accessing a host computing device. By authenticating a candidate user with dynamic data, overall security is improved as old data is phased out over time.

Accordingly, fewer fraudulent intrusions occur. Additionally, the use of transaction data associated with the authentic user allows for secure authentication without the use of complicated or difficult to remember passwords.

The operations described herein may be performed by a computer or computing device. A computer or computing device may include one or more processors or processing units, system memory, and some form of computer readable media. Exemplary computer readable media include flash memory drives, digital versatile discs (DVDs), compact discs (CDs), floppy disks, and tape cassettes. By way of example and not limitation, computer readable media comprise computer-readable storage media and communication media. Computer-readable storage media are tangible and non-transitory and store information such as computer readable instructions, data structures, program modules, or other data. Communication media, in contrast, typically embody computer readable instructions, data structures, program modules, or other data in a transitory modulated data signal such as a carrier wave or other transport mechanism and include any information delivery media. Combinations of any of the above are also included within the scope of computer readable media.

This written description uses examples to describe the disclosure, including the best mode, and also to enable any person skilled in the art to practice the disclosure, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for authenticating a request by a candidate user to access a host computing device, the host computing device in communication with an authenticating computing device, said method comprising:
    receiving, by the authenticating computing device, an authentication request for accessing data stored on the host computing device, wherein the authentication request includes at least one of a media access control (MAC) address and an Internet protocol (IP) address of a user device associated with the candidate user;
    retrieving, by the authenticating computing device from a database, transaction data associated with the at least one of the MAC address and the IP address, wherein the transaction data comprises a plurality of records each corresponding to one of a plurality of previously completed payment transactions;
    generating, by the authenticating computing device, a challenge question and a correct answer to the challenge question based on the retrieved transaction data; and
    transmitting, by the authenticating computing device, the challenge question and the correct answer to the host computing device without exposing the transaction data to the host computing device.

2. The method of claim 1 further comprising:
    generating, by the authenticating computing device, the challenge question before receiving the authentication request; and
    storing, by the authenticating computing device, the challenge question within the database.

3. The method of claim 2 further comprising:
    generating, by the authenticating computing device, the correct answer to the challenge question before receiving the authentication request; and
    storing, by the authenticating computing device, the correct answer within the database.

4. The method of claim 1 further comprising generating, by the authenticating computing device, the challenge question in response to the authentication request.

5. The method of claim 4 further comprising generating, by the authenticating computing device, the correct answer to the challenge question in response to the authentication request.

6. The method of claim 1 further comprising generating, by the authenticating computing device, the challenge question based on the transaction data from a predefined period of time, wherein the predefined period of time is defined by at least one of a level of security and an ease of use for the candidate user.

7. The method of claim 1 further comprising:
    generating, by the authenticating computing device, at least one incorrect answer to the challenge question by comparison to the transaction data; and
    transmitting, by the authenticating computing device to the host computing device, the at least one incorrect answer along with the challenge question and the correct answer.

8. An authenticating computing device for authenticating a request by a candidate user to access a host computing device, the authenticating computing device comprising a memory and a processor coupled to the memory, the processor configured to:
    receive an authentication request for accessing data stored on the host computing device, wherein the authentication request includes at least one of a media access control (MAC) address and an Internet protocol (IP) address of a user device associated with the candidate user;
    retrieve, from a database, transaction data associated with the at least one of the MAC address and the IP address, wherein the transaction data comprises a plurality of records each corresponding to one of a plurality of previously completed payment transactions;
    generate a challenge question and a correct answer to the challenge question based on the retrieved transaction data; and
    transmit the challenge question and the correct answer to the host computing device without exposing the transaction data to the host computing device.

9. The authenticating computing device of claim 8 further configured to:
    generate the challenge question before receiving the authentication request; and
    store the challenge question within the database.

10. The authenticating computing device of claim 9 further configured to:
    generate the correct answer to the challenge question before receiving the authentication request; and
    store the correct answer within the database.

11. The authenticating computing device of claim 8 further configured to generate the challenge question in response to the authentication request.

12. The authenticating computing device of claim 11 further configured to generate the correct answer to the challenge question in response to the authentication request.

13. The authenticating computing device of claim 8 further configured to generate the challenge question based on the transaction data from a predefined period of time, wherein the predefined period of time is defined by at least one of a level of security and an ease of use for the candidate user.

14. The authenticating computing device of claim 8 further configured to:
  generate at least one incorrect answer to the challenge question by comparison to the transaction data; and
  transmit to the host computing device the at least one incorrect answer along with the challenge question and the correct answer.

15. A non-transitory computer readable storage medium having computer-executable instructions embodied thereon for authenticating a request by a candidate user to access a host computing device, wherein when executed by at least one processor, the computer-executable instructions cause the at least one processor to:
  receive an authentication request for accessing data stored on the host computing device, wherein the authentication request includes at least one of a media access control (MAC) address and an Internet protocol (IP) address of a user device associated with the candidate user;
  retrieve, from a database, transaction data associated with the at least one of the MAC address and the IP address, wherein the transaction data comprises a plurality of records each corresponding to one of a plurality of previously completed payment transactions;
  generate a challenge question and a correct answer to the challenge question based on the retrieved transaction data; and
  transmit the challenge question and the correct answer to the host computing device without exposing the transaction data to the host computing device.

16. The non-transitory computer readable storage medium of claim 15, wherein the computer-executable instructions further cause the at least one processor to:
  generate the challenge question before receiving the authentication request; and
  store the challenge question within the database.

17. The non-transitory computer readable storage medium of claim 16, wherein the computer-executable instructions further cause the at least one processor to:
  generate the correct answer to the challenge question before receiving the authentication request; and
  store the correct answer within the database.

18. The non-transitory computer readable storage medium of claim 15, wherein the computer-executable instructions further cause the at least one processor to generate the challenge question in response to the authentication request.

19. The non-transitory computer readable storage medium of claim 18, wherein the computer-executable instructions further cause the at least one processor to generate the correct answer to the challenge question in response to the authentication request.

20. The non-transitory computer readable storage medium of claim 15, wherein the computer-executable instructions further cause the at least one processor to generate the challenge question based on the transaction data from a predefined period of time, wherein the predefined period of time is defined by at least one of a level of security and an ease of use for the candidate user.

21. The non-transitory computer readable storage medium of claim 15, wherein the computer-executable instructions further cause the at least one processor to:
  generate at least one incorrect answer to the challenge question by comparison to the transaction data; and
  transmit to the host computing device the at least one incorrect answer along with the challenge question and the correct answer.

* * * * *